July 29, 1969  G. MOSS ET AL  3,458,044
TREATMENT OF COAL AND OTHER MINERALS
Filed Sept. 8, 1966
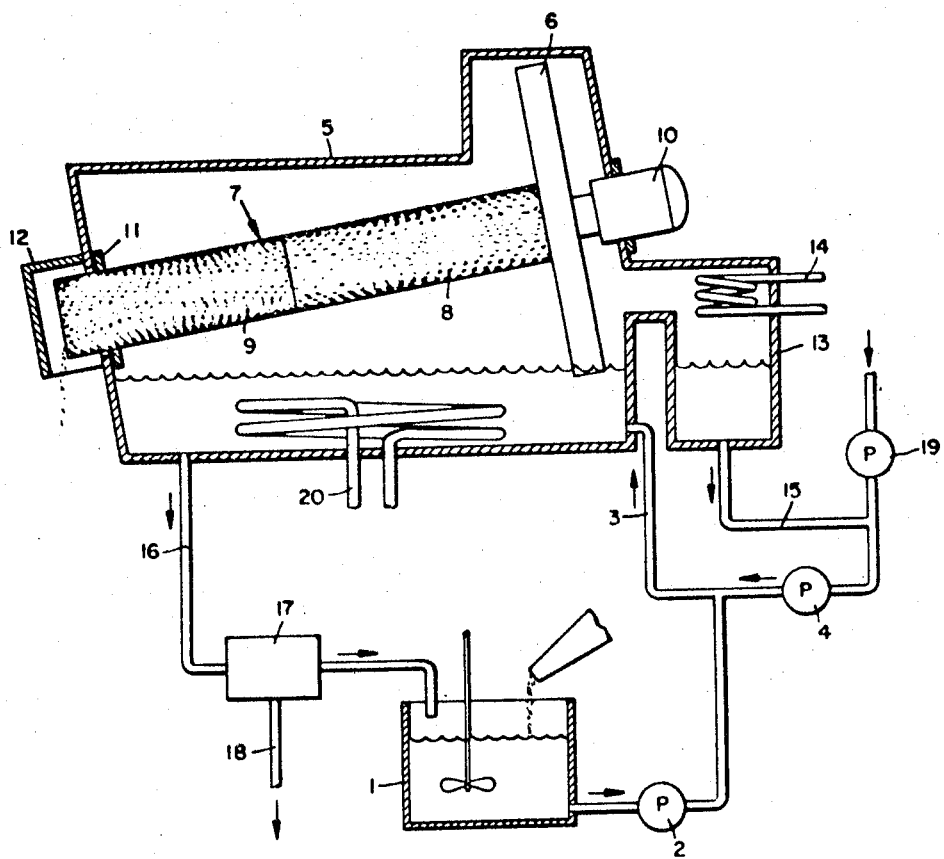
G. MOSS
E. C. STOCKILL   INVENTORS United States Patent Office 3,458,044
Patented July 29, 1969

3,458,044
TREATMENT OF COAL AND OTHER MINERALS
Gerald Moss, Oxford, and Edward Cyril Stockill, Eynsham, England, assignors to Esso Research and Engineering Company, a corporation of Delaware
Filed Sept. 8, 1966, Ser. No. 577,964
The portion of the term of the patent subsequent to July 30, 1985, has been disclaimed
Int. Cl. B01d 43/00; B03d 1/04
U.S. Cl. 209—166                              6 Claims

ABSTRACT OF THE DISCLOSURE

Mineral particles such as coal may be removed from aqueous slurries or suspensions by adding a minor amount of water immiscible organic liquid having a higher surface affinity for the mineral to be removed than water and having an initial boiling point lower than the boiling point of water; reducing the pressure on the system so as to volatilize the organic liquid but not the water to thereby carry the mineral to the surface of the slurry or suspension and recovering the mineral.

---

This invention relates to the recovery of coal or other minerals from aqueous slurries and suspensions with the removal of dross material, such as ash or gangue, from them. The invention is particularly suited to the recovery of coal, although, as will be seen from the following description, it is not limited to coal recovery but may be applied to other minerals such as ores in general for example bauxite, phosphate rock, fluorspar, iron ores, copper ores, lead ores and zinc ores.

Amongst the objects of the invention are to improve and cheapen the removal of water from the aqueous slurries and suspensions aforesaid and, at the same time, to remove dross from the minerals such as the removal of ash and other impurities from coal, and gangue from ores.

The figure illustrates apparatus for carrying out the flotation process with coal.

In the invention there is added, to the aqueous slurry or suspension of the coal, or other mineral matter, a minor amount of a substantially water immiscible organic liquid or a liquid mixture (hereafter referred to as the volatile liquid) which has a higher surface affinity for the coal or other mineral than has water, and which volatile organic liquid or liquid mixture, or a substantial proportion thereof, has a lower boiling point than the boiling point of water. The expression liquid mixture is intended to include liquefied gas or a mixture thereof with an organic material that is liquid at ambient temperature and pressure. In the slurry or suspension the volatile organic liquid, or liquid mixture which has been added is then at least partially evaporated, at a temperature below the boiling point of water, but at, or above, the boiling point of the volatile organic liquid, or of a substantial proportion of its constituents if it is a mixture, under the conditions of operation, whereby that portion of the feed material which has been wetted by the volatile organic liquid is carried to the surface of the slurry or suspension from which it may be recovered in known manner.

The separated mineral may be collected on a simple sieve or screen or by filtration, according to the particle size of the separated mineral matter; vacuum filtration may be used if considered necessary or desirable.

It is preferred that the separation be carried out in a continuous manner and the ratio of mineral to water by weight, in the slurry or suspension being fed into the flotation chamber, is suitably between 1:1 and 1:20, the ratio being limited on one hand by the pumpability of the slurry and the effect of dilution on the efficiency of separation, and on the other hand by the water consumption of the process.

The slurry or suspension preferably contains not more than 50% solids by weight, advantageously less than 25%, and the mineral particles preferably do not exceed 1000 microns mean diameter. Whilst the average particle size of the mineral may be as high as 800 microns it is preferably in the range from 50 to 400 microns.

In cases in which the major part of the mineral matter is caused to float, it is possible to use relatively concentrated slurries or suspensions since the capacity of the flotation chamber may be relatively large giving a long holdup time for the tailings which will be at a lower concentration than the floatable mineral matter so that the incoming slurry or suspension is diluted on entering the flotation chamber.

Where the volatile liquid is a gas at standard temperature and pressure, it may be liquefied under pressure and passed into the slurry and caused to evaporate when the vapour pressure of the volatile material is higher than the pressure prevailing in the slurry, e.g. if the slurry is at ambient temperature and pressure. The latent heat of evaporation of the volatile material may be drawn completely or in part from the sensible heat of the slurry. Examples of such volatile liquids are liquefied butane or propane gases. Alternatively the volatile liquid may be one that is liquid at standard temperature and pressure but which evaporates under reduced pressure at, for example, ambient temperature, e.g. pentane. Pentane, or a higher boiling liquid, which initially boils below the boiling point of water, may be heated to some extent at reduced pressure. If desired a combination of liquefied gas and liquids may be used and heating may be applied under any of the foregoing circumstances. The volatile organic liquid is present preferably in an amount to provide not less than 1% by weight, based on the weight of the coal or other mineral in the aqueous slurry or suspension, before the heating step is applied; particularly preferred is 5 to 25% by weight based on the weight of the coal or other mineral. The slurry or suspension may also contain a minor proportion of a hydrocarbon oil of much lower volatility, e.g. kerosene, a gas oil, or a residual fuel oil, which remains associated with the mineral, particularly with coal, during the whole of the process and prevents re-wetting of the mineral by water as the more volatile organic liquid evaporates.

The aqueous suspension or slurry may be treated with the volatile organic liquid by simple mixing, e.g. in a conventional mixing vessel with a stirrer, but the treatment is preferably effected by "in line" mixing in a suitable conduit leading to a vessel in which the volatile organic liquid is caused to evaporate and to cause flotation of the coal or other mineral. Mixing may be conducted at any convenient temperature below that which would initiate substantial vaporisation of the volatile organic liquid, suitably at ambient temperatures.

In the form of the invention wherein a liquefied gas, e.g. liquid propane gas, is mixed with the slurry under pressure and allowed to evaporate in the slurry under atmospheric pressure, in a continuous manner, the operation can be carried out with apparatus of known type using a throttle valve, for the passage of the slurry. However, in order to avoid difficulties likely to arise when the slurry contains coarse particles, an alternative form of apparatus is proposed wherein the slurry is pumped through a casing containing a radial bladed impeller giving rise, in operation, to a radial pressure field. A simple centrifugal pump may be used for this purpose. The liquified gas is injected into the pressurised slurry between a force pump and the centrifugal pump so that the pressure is reduced as the slurry passes radially inwards towards the central part of the centrifugal pump. If desired fuel oil, or other added material as hereinbefore referred to, may be injected along with the liquefied gas.

The solid matter which floats to the surface of the aqueous slurry or suspension may then be separated and collected by any suitable means e.g. by allowing it to spill over a weir, or by scooping it up continuously and then draining it on a screen, or by suction on a filter.

As previously stated it has been found advantageous to add to certain systems, particularly those containing coal, preferably dissolved in the volatile organic liquid carrier, a proportion of a lower volatility organic liquid preferably of higher boiling point than water, e.g. kerosene, a gas oil or a residual fuel oil, hereinafter referred to as involatile organic liquid.

The involatile organic liquid serves two useful purposes; it not only reduces the loss of coal or other mineral matter retained during flotation in the aqueous phase but it also facilitates dewatering of the coal or other mineral matter which has been floated.

The amount of involatile organic liquid that it is advantageous to use will vary according to the quality and particle size of the coal or other mineral dispersed in the slurry and it may be in the range of up to 10 wt. percent based on the weight of coal or other mineral matter.

Particularly suitable involatile organic liquids have been found to be, for example, residual fuel oils of 3,500 SSU viscosity at 100° F.; other suitable oils may include for example gas oils, phenol extracts, kerosene and coal tar.

We have found that when a small amount of a normal alcohol of chain length above $C_{14}$, and preferably in the range of $C_{16}$ to $C_{26}$, is stirred into the slurry prior to the addition of the lower boiling organic liquid or liquid mixture, the proportion of coal or other mineral which may be subsequently floated by heating the organic liquid, is significantly increased. We have found, further, that good coal recovery may be achieved at low pH values, e.g. pH 3.6, whereas in the absence of the alcohol, optimum flotation has been found to occur under slightly alkaline conditions, e.g. in the region of pH 8.0. The selected alcohols are not appreciably soluble in water and are known to form a monolayer at an air/water interface. It is therefore reasonable to assume that spreading of the alcohol over the surface of the coal occurs as the coal reaches the surface of the slurry. On the other hand the corresponding acids, which will also form mono-molecular layers, have been found to have a depressant effect which increases coal losses. The required dose rate is very low and useful results have been obtained with as little as 0.03% by weight of alcohol based on the weight of coal in the slurry. For example good results have been obtained in a pilot plant rig at a rate of 150 grams of cetyl alcohol per ton of coal.

It is also within the purview of the invention to use in the slurry, together with the volatile organic liquid, either with or without the involatile organic liquid, minor amounts of compounds used in mineral flotation techniques which are known to those skilled in the art and referred to as "floatation reagents." Such reagents are described for example in "Introduction to the Theory of Flotation," Klassen and Mokrousov, "Classification of Floatation Reagents," Table 20, p. 154 (Butterworth). These reagents may include, for example, oleic acid, sodium carbonate, lime, sodium ethyl xanthate, sodium alkyl sulphates, sulphuric acid, dextrin, starch, terpineol and phenol.

It has been found thus that the mixing energy required to cause wetting of coal or other mineral particles by the volatile organic liquid can be substantially reduced, and the loss of combustible material can also be reduced, by adding to the mixture a surface active compound which facilitates wetting of the particles by the volatile organic liquid and which helps to prevent rewetting of the mineral by water. The surface active agent may be added in addition to, or in substitution for, the involatile organic liquid previously referred to and is preferably employed in concentrations of up to 0.2% by weight based on the weight of the mineral in the slurry or suspension. In the case of bituminous coals which have been stored in a pulverised condition, the use of anionic surface active compounds, which may be soluble in either the aqueous or organic phase of the mixture, has been found particularly suitable. Thus the stirring time necessary to reduce the loss of combustible solids to the same level has been found to be less by a factor of at least 5 when 0.002 weight (based on water content of the mixture) of an anionic detergent (active ingredient) is added to the mixture. Moreover, the absolute value of the loss of combustible solids can be reduced by a factor of at least 2 by the same addition.

It has also been found that adjustment of pH of the aqueous mineral slurry with such reagents as lime or sodium carbonate can be beneficial, but the limits of pH can vary since the optimum pH range is governed largely by the nature of the solid particles. However, as previously mentioned, the $C_{14}^{+}$ alcohols give better results in acid conditions.

The nature of the invention is further illustrated by the following examples:

EXAMPLE I 100 grams of a coal/water slurry were prepared containing 20 w. percent of a 501 rank coal from Northumberland and Durham, having an average particle size ranging up to 850 microns, ash content 27 w. percent and a sulphur content of 3.29 w. percent on a dry ash-free basis. To the slurry at ambient temperature was added 15% w. (of coal) of a petroleum fraction having the following characteristics.

| | ° F. |
|---|---|
| Initial boiling point | 93 |
| Distillation (percent): | |
| 5 | 113 |
| 10 | 115 |
| 50 | 124 |
| 90 | 144 |
| 95 | 149 |
| Final boiling point | 173 |

The mixture was stirred thoroughly for 1 minute at 35° F. and then the temperature of the mixture was raised to 120° F. by adding hot water when the ratio of coal to water became about 1–15. Agglomerates floated to the surface of the suspension and was scooped off and collected on a sieve. The separated coal had an ash content of 4.98% w. (on a dry ash-free basis) and the loss of combustible material from the separated coal was 17.9 w. percent.

EXAMPLE II

To a slurry prepared as in Example I and whose temperature was 35° F. was added 15% (by weight of the coal) of a liquid petroleum fraction known as LPG comprising essentially $C_4$ hydrocarbons. The boiling point under atmospheric pressure of the LPG is 31° F. and in order to maintain it in a liquid condition for mixing it was first chilled to 20° F. The mixture was stirred thoroughly for 1 minute at 35° F. when water was added to it to bring the temperature of the system to 55° F. and the coal/water ratio became 1–15.

The separated coal contained 5.15 w. percent ash and the combustible losses were 22.4 w. percent.

EXAMPLE III

The same procedure as in Example I was followed except that to the light petroleum fraction was first added before mixing it to the slurry 5% by weight of the coal of a 50–50 blend of white spirit and a fuel oil of 3500 SSU nominal viscosity of 100° F.

The separated coal contained 6.91% w. ash and the combustible losses were 4.9 w. percent.

EXAMPLE IV

The same procedure as that used in Example II was used except to that to the chilled LPG was first added at 50° F. before mixing into the slurry, 5% (by weight of the coal) of a 50–50 blend of white spirit and a fuel oil of 3500 SSU nominal viscosity at 100° F.

The separated coal contained 7.32 w. percent ash and combustible losses were 4.0 w. percent.

EXAMPLE V

The same procedure as in Example IV was used except that the amount of fuel oil/white spirit blend was 10% w. on the coal.

The treated coal ash content was 6.87 w. percent and the loss of combustible was 4.3 w. percent.

EXAMPLE VI

The same procedure was followed as in Example V except that the amount of LPG used was 30 w. percent and the separated coal contained 6.58 w. percent and the loss of combustibles was 3.8 w. percent.

The results of the above experiments are summarized in the following table:

PERCENT WEIGHT ON COAL

| Ex. | LVN | LPG | Fuel Oil plus White Spirit | Flotation Temp., °F. | Treated Coal Ash percent w. | Combustible Losses, percent w. |
|---|---|---|---|---|---|---|
| I | 15 | | | 120 | 4.98 | 17.9 |
| II | | 15 | | 55 | 5.15 | 22.4 |
| III | | 15 | 5 | 120 | 6.91 | 4.9 |
| IV | | 15 | 5 | 55 | 7.32 | 4.0 |
| V | | 15 | 10 | 55 | 6.87 | 4.3 |
| VI | | 30 | 10 | 55 | 6.58 | 3.8 |

The advantageous effect of the alcohols of the invention is further illustrated by reference to the following examples:

EXAMPLE VII

Two samples of Birch Coppice 900 rank coal were treated in the laboratory under identical conditions with and without cetyl alcohol at 0.1% by weight on coal with the following results:

| | Ash on— | | Sulphur | | |
|---|---|---|---|---|---|
| | Raw Coal, percent | Treated Coal, percent | Raw Coal,[1] percent | Treated Coal, percent | Coal Losses, percent |
| Cetyl Alcohol: | | | | | |
| Without | 26 | 5.4 | 6.1 | 3.6 | 19 |
| With | 26 | 8.3 | 6.1 | 4.2 | 4.5 |

[1] Dry ash free.

EXAMPLE VIII

Two 75 lb. samples of Birch Coppice 900 rank coal were treated in the pilot rig under identical conditions with and without 10 grams of cetyl alcohol in the slurry with the following results:

| | Ash on— | | Sulphur | | |
|---|---|---|---|---|---|
| | Raw Coal, percent | Treated Coal, percent | Raw Coal,[1] percent | Treated Coal,[1] percent | Coal Losses, percent |
| Cetyl Alcohol: | | | | | |
| Without | 26.2 | 7.9 | 6.2 | 3.8 | 15.6 |
| With | 25.5 | 7.6 | 9.3 | 4.2 | 4.5 |

[1] Dry ash free.

EXAMPLE IX.—LABORATORY TESTS

Conditions:
 Annersley coal
 Particle size (mean)—395
 Slurry—20 wt. percent solids/water
 LVN—15 wt. percent on coal Conditions:
 Fuel oil—5 wt. percent on coal—Amuay 3500 sec.
 Stirring time—60 seconds
 Additive—0.1 wt. percent on coal
 Flotation temperature—120° F.
 Ash content (untreated coal)—15.3 wt. percent

| Additive | Treated Coal Ash percent wt. | Comb. Loss, percent wt. |
|---|---|---|
| 0 | 5.00 | 16.3 |
| Hexanol | 5.15 | 13.4 |
| Decanol | 4.73 | 8.7 |
| Cetyl Alcohol (C$_{16}$) | 4.76 | 4.2 |
| | 4.82 | 4.9 |
| Octo Decanol | 5.20 | 3.4 |
| | 5.31 | 4.2 |
| C$_{20}$–C$_{28}$ St. Chain Alcohols | 4.78 | 5.4 |
| | 4.94 | 5.9 |
| Hexadecanol (branch chain) | 4.73 | 6.6 |
| Oxo Bottoms (branch chain) (C$_{20}$) | 4.72 | 9.6 |

CHARACTERISTICS OF ALCOHOLS

| | M.P., °C. | Solubility in Water, v. percent |
|---|---|---|
| n-Octanol | −14 | <.02 |
| n-Decanol | −6 | <.02 |
| n-Dodecanol | 24 | <.02 |
| n-Tetradecanol | 37 | <.02 |
| Branched chain tetradecanol | −65 | <.02 |
| n-Hexadecanol | 49 | <.02 |
| Branched chain heptadecanol | −60 | <.02 |
| n-Octadecanol | 69 | <.02 |

EXAMPLE X

The invention is further illustrated by the following example showing evaporation of the volatile liquid by pressure reduction.

Materials used:
 n-Pentane—Boiling range 34–38° C. (93–100° F.)
 Amuay 3500″ fuel oil
 Denby Drury Low Coal 702 Rank from the East Midlands, ground to 300 mic. approximately mean particle size. This sample contained approximately 25% ash by weight.

The test was carried out as follows:

20 gr. of coal was slurried with 80 cc. of water at 65° F. A mixture of n-pentane and fuel oil was added to the slurry (15% pentane, 5% fuel oil by weight on coal) and mixed, under the same standard conditions as those previously referred to for one minute. The mixture was then transferred to a separating funnel and diluted with a further 100 cc. of water. At this stage some of the oiled coal was floating. A vacuum of 20″ Hg [1] was applied to the funnel and the remaining coal rose to the surface except for some small particles trapped under the ashy mineral which had settled on the funnel bottom. This ashy material and most of the water was removed from the funnel bottom into a second container (also under vacuum). Most of the trapped coal rose to the surface in this container. In a first test, a determination was carried out on the coal from the separating funnel and the total material in the second container. In a second test the coal floating on the surface of the second container was separated and added to that in the funnel. The results were as follows:

| | Test 1 | Test 2 |
|---|---|---|
| Treated Coal Ash, percent wt | 3.4 | 3.8 |
| Separated material ash, percent wt | 67.8 | 77.0 |
| Combustibles loss, percent wt | 8.2 | 4.2 |

When the mineral treated is coal, the product of the invention is a de-ashed coal having a low water content and in its preferred form consists of agglomerates containing a small amount of fuel oil which prevents the

[1] At this pressure the boiling point of the n-pentane was approximately 40° F.

coal from being re-wetted by water. Thus the product of the invention may not only be used as feed directly to a coal-burning furnace, but may also be re-suspended in water for transport over long-distance, e.g. by pipeline, the coal agglomerates being easily separated from the water at the destination by simple screening of filtration to give a relatively dry product. Thus the invention is adapted to the de-ashing and de-watering of aqueous coal-oil slurries before transportation, thus reducing transportation costs in proportion to the ash removed.

The application of the invention to the beneficiation of ores is shown by reference to the following Example XI, in which tests were conducted with an iron ore.

EXAMPLE XI

In each test in this series, 10 gs. of a haemetite concentrate were slurried with 90 gs. of water. The haemetite concentrate contained 5% by wt. of acid insoluble material (silica and alumina). It had been ground to below 210 microns with a means size of 60 microns.

The slurry was then conditioned by stirring with 0.01% (on ore wt.) of acid nonyl phosphate. Acid nonyl phosphate is a commercial form of di-nonyl phosphate which probably contains minor amounts of mono nonyl phosphate.

A light virgin naphtha petroleum fraction (LVN) having the same characteristics as that used in Example I, was then added in various proportions to the slurry and mixed for one minute. The mixture was heated to 110° F. and the iron oxide which has been wetted by the LVN was floated to the surface. The following table gives the results obtained.

| LVN used, percent wt. on ores | Total Ore, Percent | | Acid Insolubles, percent wt. of ore | |
|---|---|---|---|---|
| | Floating | Sinking | Floating | Sinking |
| 5 | 94 | 6 | 3.71 | 25.0 |
| 10 | 87 | 13 | 2.73 | 19.8 |
| 15 | 84 | 18 | [1] 1.94 | [1] 20.9 |
| 20 | 82 | 18 | 1.92 | 18.8 |
| 30 | 84 | 16 | 2.26 | 18.6 |

[1] Mean of four tests.

It can be seen that using LVN in increasing quantities up to about 15 percentage weight on ore leads to a minimum value of undesired material in the form of acid insolubles.

Powdered coal containing a proportion of ash, and which may be in the form of a slurry or suspension in water, is introduced into a mixing vessel 1 containing water, where it is brought to a suitable concentration of coal in suspension. The suspension is then pumped by a metering pump 2 to a mixing line 3. Light virgin naphtha or other suitable volatile organic liquid, is also fed into the mixing line 2 by a metering pump 4. This naphtha may contain a small proportion of fuel oil, or other much less volatile liquid than the naphtha. The mixture of naphtha and aqueous suspension of coal may be agglomerated by passage through the mixing line 1 and/or on entry into the closed process vessel 5. In the vessel 5, which preferably contains an inert atmosphere, it is heated to an appropriate temperature by a coil 20, heated by steam or other suitable means, to partially evaporate the naphtha and cause the coal to float as agglomerates or as a forth to the surface of the aqueous liquid therein.

The floating coal is picked up by a scoop 6 which feeds wet coal continuously to a rotating screen 7 comprising a coarse mesh region 8 and a fine mesh region 9. The scoop 6 and screen 7 are rotated continuously by the motor 10. Coal agglomerates are retained on the screen 7 but water drains back into the vessel 5. Ash from the coal sinks to the bottom of the vessel 5. Naphtha evaporating from the suspension is condensed in a condenser 13 cooled by a refrigerating coil 14.

De-ashed and de-watered coal retained by the rotating screen 7 is delivered as product through an extension of the screen 7 projecting through a baffle seal 11 in the end of the process vessel 5 and protected by a hood 12. Condensed naphtha passes by a line 15 to the metering pump 4 and is recirculated to the mixing line 3. Fuel oil is supplied by the metering pump 19. The ash from the bottom of the process vessel 5 is drawn off as an aqueous slurry through a line 16 and filtered continuously by a filter 17 which returns the water to the mixing vessel 1 and delivers the ash at 18.

As an alternative to the screen 7 a suitable form of vacuum filter drum may be employed.

The atmosphere in process vessel 5 is preferably inert and for example may be supplied by the exhaust from a diesel driven heat pump which transfers heat from the refrigerating coil 14 to the heating coil 20.

What is claimed is:

1. A floatation process for removing mineral particles from an aqueous system selected from the group consisting of slurries and suspensions of said mineral particles having a mean average diameter above about 50 microns which comprises adding to the system a minor amount of a substantially water immiscible organic liquid having a higher surface affinity for the mineral to be removed than water and having an initial boiling point lower than the boiling point of water and reducing the pressure on the system so as to volatilize at least part of the organic liquid but not the water whereby the mineral is carried to the surfaces of the slurry or suspension and recovering the mineral.

2. The method of claim 1 which comprises adding in addition a minor amount of a high boiling constituent having a boiling point higher than the boiling point of water, said constituent being selected from the group consisting of residual fuel oils, gas oils, phenol extracts, kerosene, coal tar and $C_{16}$ to $C_{26}$ alcohols.

3. The method of claim 2 wherein a surface active agent is also added to said aqueous system to facilitate the wetting of said mineral particles by said water immiscible organic liquid having an initial boiling point lower than the boiling point of water.

4. The process of claim 3 wherein said mineral particles comprise co-particles having a mean average diameter ranging from about 50 to about 400 microns.

5. The process of claim 4 wherein said water immiscible organic liquid having a boiling point lower than the boiling point of water is selected from the group consisting of liquefied propane, liquefied butane and liquefied pentane.

6. The process of claim 5 wherein the mineral is coal.

References Cited

UNITED STATES PATENTS

| | | | |
|---|---|---|---|
| 809,959 | 1/1906 | Kirby | 209—166 |
| 826,411 | 7/1906 | Elmore | 209—166 |
| 835,120 | 11/1906 | Sulman | 209—166 |
| 1,246,665 | 11/1917 | Scott | 209—166 |
| 1,261,303 | 4/1918 | Scott | 209—166 |
| 1,707,604 | 4/1929 | Fisher | 209—166 |
| 2,467,369 | 4/1949 | Bishop | 209—166 |
| 2,561,251 | 7/1951 | Van Aardt | 209—166 |

HARRY B. THORNTON, Primary Examiner

ROBERT HALPER, Assistant Examiner

U.S. Cl. X.R.

209—164; 210—44